United States Patent
Specht et al.

(10) Patent No.: US 6,290,159 B1
(45) Date of Patent: Sep. 18, 2001

(54) SEAT BELT RETRACTOR

(75) Inventors: Martin Specht, Feldafing; Thomas Kilian, Germering; Walter Krauss, München, all of (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/433,169

(22) Filed: Nov. 3, 1999

(30) Foreign Application Priority Data

Jan. 22, 1999 (DE) .............................................. 199 02 483

(51) Int. Cl.⁷ .................................................. B60R 22/28
(52) U.S. Cl. ........................................ 242/379.1; 280/805
(58) Field of Search ................................ 242/379.1, 383; 280/805, 806; 297/470, 471, 472; 180/268, 45; 701/47

(56) References Cited

U.S. PATENT DOCUMENTS

| | | | |
|---|---|---|---|
| 3,881,667 | * | 5/1975 | Tandetzke ......................... 242/379.1 |
| 4,678,134 | * | 7/1987 | Ameur ................................ 242/383 |
| 4,741,491 | * | 5/1988 | Andersson et al. .................. 242/383 |
| 5,611,498 | * | 3/1997 | Miller, III et al. ................. 242/379.1 |
| 5,653,462 | * | 8/1997 | Breed et al. ......................... 280/735 |
| 5,788,177 | * | 8/1998 | Keller et al. ....................... 242/379.1 |
| 5,799,893 | * | 9/1998 | Miller et al. ....................... 242/379.1 |
| 5,820,056 | * | 10/1998 | Dybro et al. .......................... 242/374 |
| 5,823,570 | * | 10/1998 | Lane et al. .......................... 242/379.1 |
| 6,012,667 | * | 1/2000 | Clancy et al. ..................... 242/379.1 |

FOREIGN PATENT DOCUMENTS

| | | | |
|---|---|---|---|
| 2215892 | * | 10/1973 | (DE) . |
| 4302042-A1 | * | 7/1994 | (DE) . |
| 4426621-A1 | * | 2/1996 | (DE) . |
| 19604483C1 | * | 3/1997 | (DE) . |
| 19653510A1 | * | 6/1997 | (DE) . |
| 29717477U1 | * | 1/1998 | (DE) . |
| 23195021A | * | 5/1998 | (GB) . |
| WO8504628 | * | 10/1985 | (WO) . |

* cited by examiner

Primary Examiner—John M. Jillions
(74) Attorney, Agent, or Firm—Lonnie Drayer

(57) ABSTRACT

A seat belt retractor has a belt reel for the seat belt webbing. A load limiter allows limited extraction of the belt webbing with energy absorption when the belt reel is blocked. The absorption of energy is adjustable as a function of crash-related data and the rotating movement of the belt reel is scanned for this purpose when the extraction of the belt webbing is limited.

16 Claims, 5 Drawing Sheets

SEAT BELT RETRACTOR

FIELD OF THE INVENTION

The present invention relates to a seat belt retractor.

DISCUSSION OF THE PRIOR ART

DE 196 04 483 C1 teaches a seat belt retractor provided with a load limiter which allows limited extraction of belt webbing with absorption of energy when the belt reel is blocked. The absorption of energy can be adjusted as a function of crash-related data detected by sensors. This crash-related data can be data about the vehicle occupant's body, seat position data, crash condition data such as severity of the crash and the like. This data is determined by sensors arranged outside the seat belt retractor and is evaluated for adjusting the energy absorption of the load limiter. This should allow the restraint characteristic of the seat belt to be influenced in a controlled manner when the seat belt is blocked, in particular after the tightening of the seat belt, optionally in conjunction with the restraint function of an airbag.

SUMMARY OF THE INVENTION

There is provided in accordance with the present invention a seat belt retractor wherein limited extraction of belt webbing with crash-related energy absorption is achieved at reduced cost when the belt reel is blocked. The rotating movement of the belt reel is scanned to yield a measurement signal, or signals for the extracted length of belt webbing and/or the velocity of extraction of belt webbing by differentiation over time and/or the acceleration of extraction of belt webbing by further differentiation over time. An actuating signal with which the load limiter is adjusted is derived from this measurement signal, or signals. The time beginning with the extraction of belt webbing with blocked belt reel is used for differentiation over time. The extracted length of belt webbing is determined by scanning of components that rotate with the belt reel and comprise markings, teeth of the set of blocking teeth or other elements that represent rotational angle increments. The measurement signal or the measurement signals and, here in particular, the signal corresponding to the acceleration of belt webbing extraction is compared with a belt force characteristic field. This belt force characteristic field reproduces the desired characteristic of the limited extraction of belt webbing. The load limiter is adjusted as a function of the comparison.

The load limiter can be an energy absorber with variable absorption of energy. For example, adjustable braking devices with which the limited extraction of belt webbing is decelerated with the desired belt force characteristic field are suitable for this purpose. Preferably an energy absorber with variable energy absorption operates by the principle of a hydraulic pump in which the rotor of the hydraulic pump is coupled to the belt reel, for example by actuation of a coupling, and the rotor conveys a hydraulic medium through a throttle device adjusted as a function of the measurement signal or the measurement signals. The hydraulic pump alone can form the adjustable load limiter. However, it is also possible to combine the hydraulic pump with an energy absorber having a predetermined energy absorption characteristic, for example with a torsion bar. The hydraulic pump then forms the variable part of the load limiter.

Instead of a hydraulic pump, an electric motor can connected to the winding shaft, for example by a coupling, in order to achieve the desired absorption of energy when the extraction of belt webbing is limited. A corresponding counter electromotive force can be generated in the electric motor for this purpose in order to achieve the necessary braking force. The electric motor can also be coupled to an energy absorber with fixed predetermined energy absorption, for example a torsion bar. It is preferable to use an electric motor of flat construction of the type known, for example, from DE 43 02 042 A1.

DE 44 26 621 A1 discloses a hydraulic pump as tightener drive for tightening a seat belt. With the present invention, however, the hydraulic pump is used for the consumption of energy, hydraulic medium being conveyed through a butterfly valve controlled by the measurement signal or the measurement signals by the rotation caused by the winding shaft. The hydraulic pump can therefore be used if limited extraction of belt webbing with energy absorption that can be adjusted to the respective incidence of a crash is to be achieved when the belt reel is blocked.

The energy absorption of the load limiter can also be adjustable in design if a plurality of cumulatively switchable energy absorbers having a predetermined energy absorption characteristic can be switched selectively cumulatively in order to achieve the desired restraint characteristic during decelerated extraction of belt webbing.

With the present invention, in contrast to the above discussed prior art, the information required for obtaining the restraint characteristic required for decelerated extraction of belt webbing is obtained from the behavior, in particular rotating behavior, of the belt reel. The severity of the crash, the weight and the size of the vehicle occupant are indicated directly by the rotating movement of the belt shaft. A direct relationship between the crash sequence and the adjustment of load limitation is therefore obtained.

BRIEF DESCRIPTION OF THE DRAWINGS

Embodiments of the invention will be described in more detail hereinafter with reference to the figures in which.

DETAILED DESCRIPTION OF THE INVENTION

Figure 1:
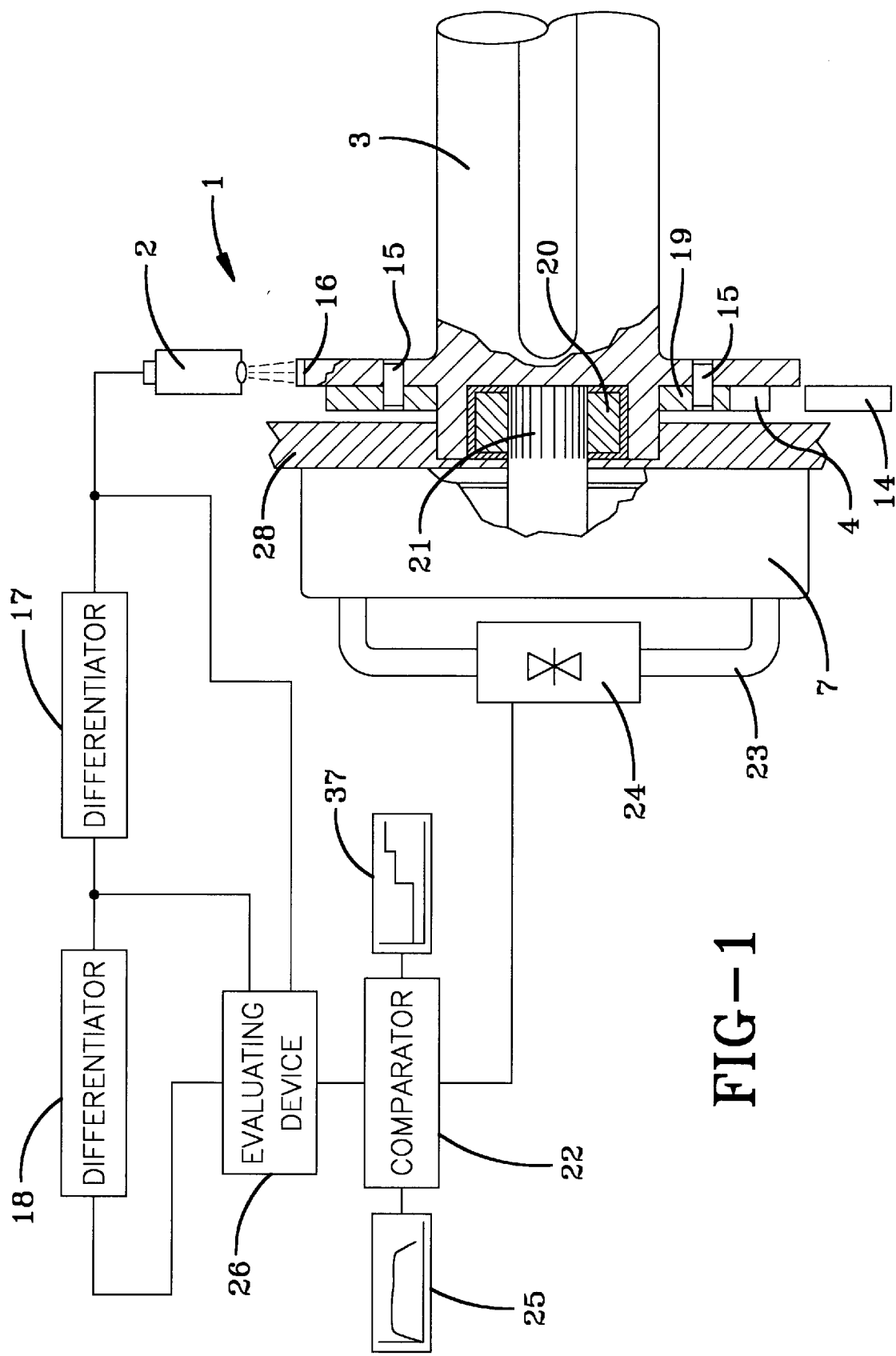
FIG. 1 shows a first embodiment of the invention with a hydraulic pump for adjusting the desired absorption of energy.

In the embodiments shown in the figures, only the components of the seat belt retractor required for understanding the invention are shown. The seat belt retractor has a belt reel 3 onto which the seat belt webbing, not shown in detail, is coiled. Blocking discs that have sets of blocking teeth 4 at their periphery are connected to the end flanges of the belt reel 3 by shearing pins 15. To block the belt reel 3 against further rotation, a blocking pawl 14 associated with each set of blocking teeth 4 is brought into engagement with the set of blocking teeth. Blocking of this type optionally takes place after the tightening of the seat belt, for example in the event of a crash.

To reduce the load transmitted from the belt webbing to a vehicle occupant's body during the forward displacement of the vehicle occupant, a limited extraction of belt webbing with braking effect or energy absorption is provided which comes into effect between the vehicle body or a seat belt retractor frame 28 and the belt reel 3. This limited extraction of belt webbing with energy absorption is ensured in the respective embodiments by a load limiter 5. In the embodiments illustrated, adjustment of the absorption of energy to a desired restraint characteristic predetermined by a belt force characteristic curve is possible as a function of the severity of the crash and/or the body weight of the vehicle occupant. For this purpose, the rotational movement of the belt reel is scanned after blocking (blocking engagement of the pawl 14 in the set of blocking teeth 4) and the energy absorption of the load limiter 5 adjusted as a function thereof.

Figure 2:
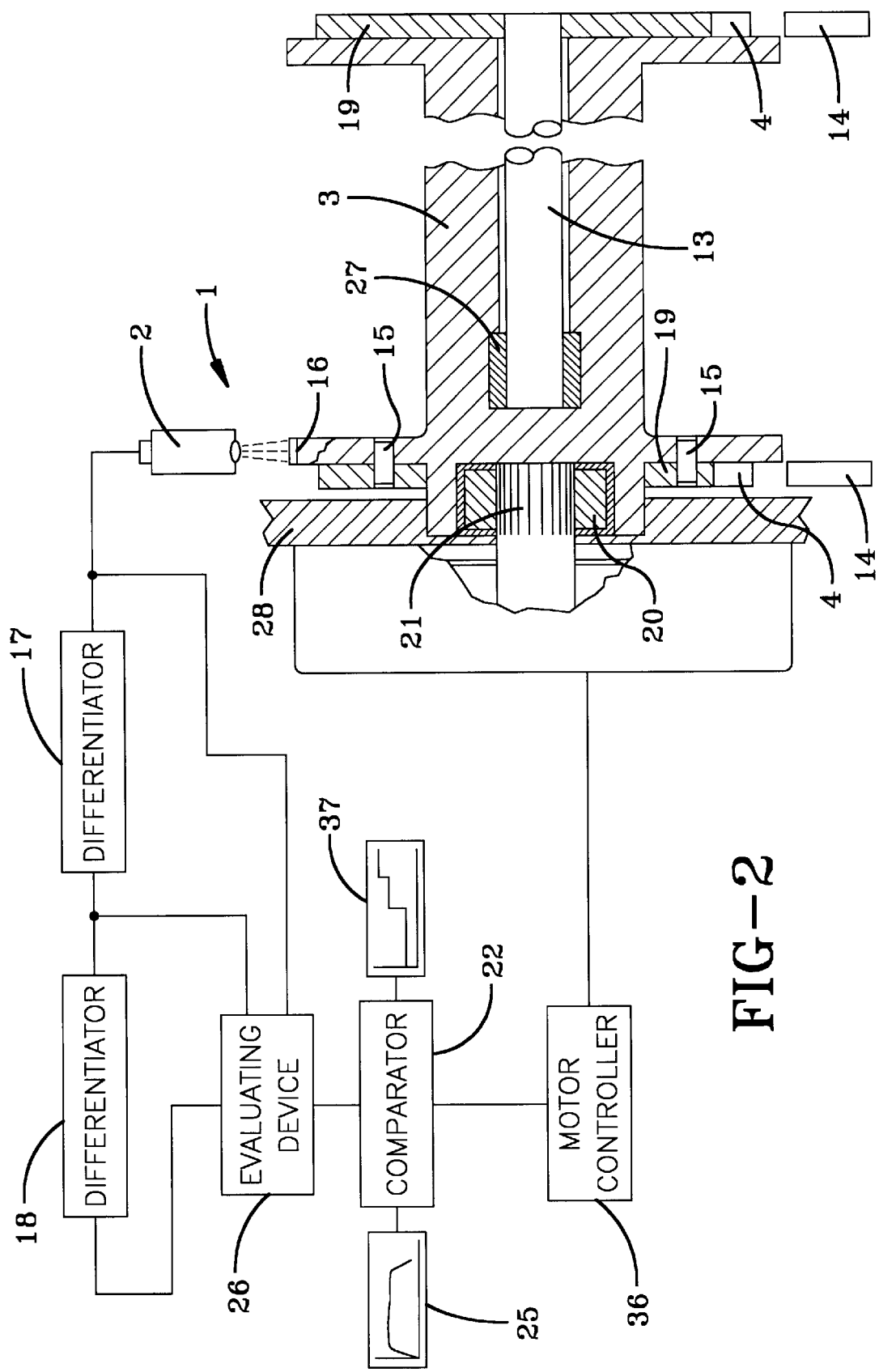
FIG. 2 shows a second embodiment of the invention with an electric motor for adjusting the absorption of energy.

In the embodiments shown in FIGS. 1 and 2, the rotation of the belt reel is scanned by a scanner 2. For example, a marking 16 representing rotational angle increments can be scanned using the scanner. By scanning the rotational angle increments of the marking, the scanner delivers a signal proportional to the length of extracted belt webbing. A measurement signal proportional to the angular velocity (speed of rotation) can be obtained by differentiation of this signal in a differentiator 17. A measurement signal proportional to the rotational acceleration is obtained by further differentiation of this velocity signal over time in a second differentiator 18. This signal proportional to the rotational acceleration is proportional to the force that comes into effect on the belt webbing or on the belt reel 3 during the forward displacement of the vehicle occupant's body. The described arrangement forms a sensor device 1 with which the above-mentioned measurement signals can be obtained.

Measurement signals containing information about the severity of the crash and about the body weight of the vehicle occupant can therefore be obtained by scanning the rotating movement of the belt reel 3. The load limiter 5 can then be adjusted optionally as a function of a predetermined belt force characteristic curve as a function of one or more of these signals.

In the described embodiments, the blocking pawl 14 is brought into engagement with the set of blocking teeth 4 after tightening of the belt on both sides or on one side of the winding shaft. During the forward displacement of the vehicle occupant's body, a force acts on the belt reel 3 such that the shearing pins 15 are sheared off and the belt reel is able to rotate relative to the blocking disc 19 secured by the blocking pawl 14. A coupling 20 is engaged by this relative rotation of the belt reel 3 with respect to the blocked blocking disc 19 so the belt reel 3 is coupled to a drive member 21 of an energy absorber designed as a hydraulic pump 7. Couplings that are engaged owing to the relative rotation of two parts are known. The hydraulic pump that is capable of operating, for example, by the Eaton principle conveys an incompressible medium, for example oil, into a closed circuit 23. This circuit comprises a controllable valve 24. The cross section of flow can be adjusted by the valve 24 for producing losses of flow and therefore for achieving the desired energy consumption. The hydraulic pump 7 and the attached circuit 23 with an adjustable cross section of flow therefore bring about an adjustable limitation of load during the limited extraction of belt webbing.

The cross section of flow can be adjusted as a function of a belt force characteristic curve filed in a memory 25. This belt force characteristic curve which is plotted in relation to the extracted length of belt webbing is compared with the force trend of the measurement signal obtained from the second differentiator 18 and the signal proportional to the extracted length of belt webbing from the scanner 2. The two signals are evaluated in an evaluating device 26 which generates a signal representing the force exerted on the belt webbing as a function of the extracted length of belt webbing. This signal is compared in the comparator 22 with the belt force set characteristic curve stored in the memory 25. The actuating signal with which the valve 24 is adjusted is derived from the comparison signal. Adjustment takes place in such a way that the curve evaluated in the evaluating device 26 for the force variation corresponds to the belt force characteristic curve stored in the memory 25.

The hydraulic pump 7 together with the closed circuit 23 can form the load limiter 5. However, it is also possible to combine the hydraulic pump and the circuit 23 with the adjustable cross section of flow (valve 24) with an energy absorber having predetermined energy absorption, for example with a torsion bar which acts on the winding shaft 3. This torsion bar can be connected to the winding shaft 3 in the manner shown in the embodiment of FIG. 2.

In the embodiment of FIG. 2 an electric motor 8 is used as variable energy absorber instead of the hydraulic pump 7. Together with the torsion bar 13, this variable energy absorber forms the adjustable load limiter. The torsion bar 13 is non-rotatably connected to the belt reel 3 at one end via an interlocking joint 27. At its other end, the torsion bar is non-rotatably connected to the blocking disc 19. This blocking disc can also be non-rotatably connected to the belt reel 3 by shearing pins 15 during normal operation. During blocking engagement of the blocking pawls 14 in the sets of blocking teeth 4, the shearing pins 15 are sheared off owing to the forces exerted on the belt reel during the forward displacement of the vehicle occupant so that the belt reel 3 rotates relative to the blocked blocking discs 19. One end of the torsion bar 13 is non-rotatably secured by the right-hand blocking disc 19 while the other end rotates with the belt reel 3 owing to the interlocking joint 27. The energy absorption predetermined by the torsion bar 3 therefore comes into effect.

As already explained in conjunction with the embodiment of FIG. 1, the comparator 22 provides an actuating signal which serves for adjustment of an additional braking force effect or acts on the belt reel 3 via the engaged coupling 20 so that the effect of the torsion bar 13 is reduced or increased. The electric motor 8 is driven in an appropriate direction of rotation. This is effected on the basis of the comparison between the predetermined belt force characteristic curve in the memory 25 and the actual variation of the belt webbing force obtained in the evaluating device 26. A motor controller 36 is actuated as a function of the comparison. The electric motor 8 can be a flat-frame motor 8 as known from DE 43 02 042 A1.

Activation of the valve 24 in the embodiment of FIG. 1 and activation of the electric motor 8 in the embodiment of FIG. 2 can also be effected as a function of the velocity of extraction of belt webbing. For this purpose, the signals from the two differentiators 17, 18 are evaluated in the evaluating device 26. A stepwise increase in energy absorption or in the load limiter force of the type shown, for example, in the embodiment of FIG. 5 and stored in a memory 37 can be achieved.

Figure 3:
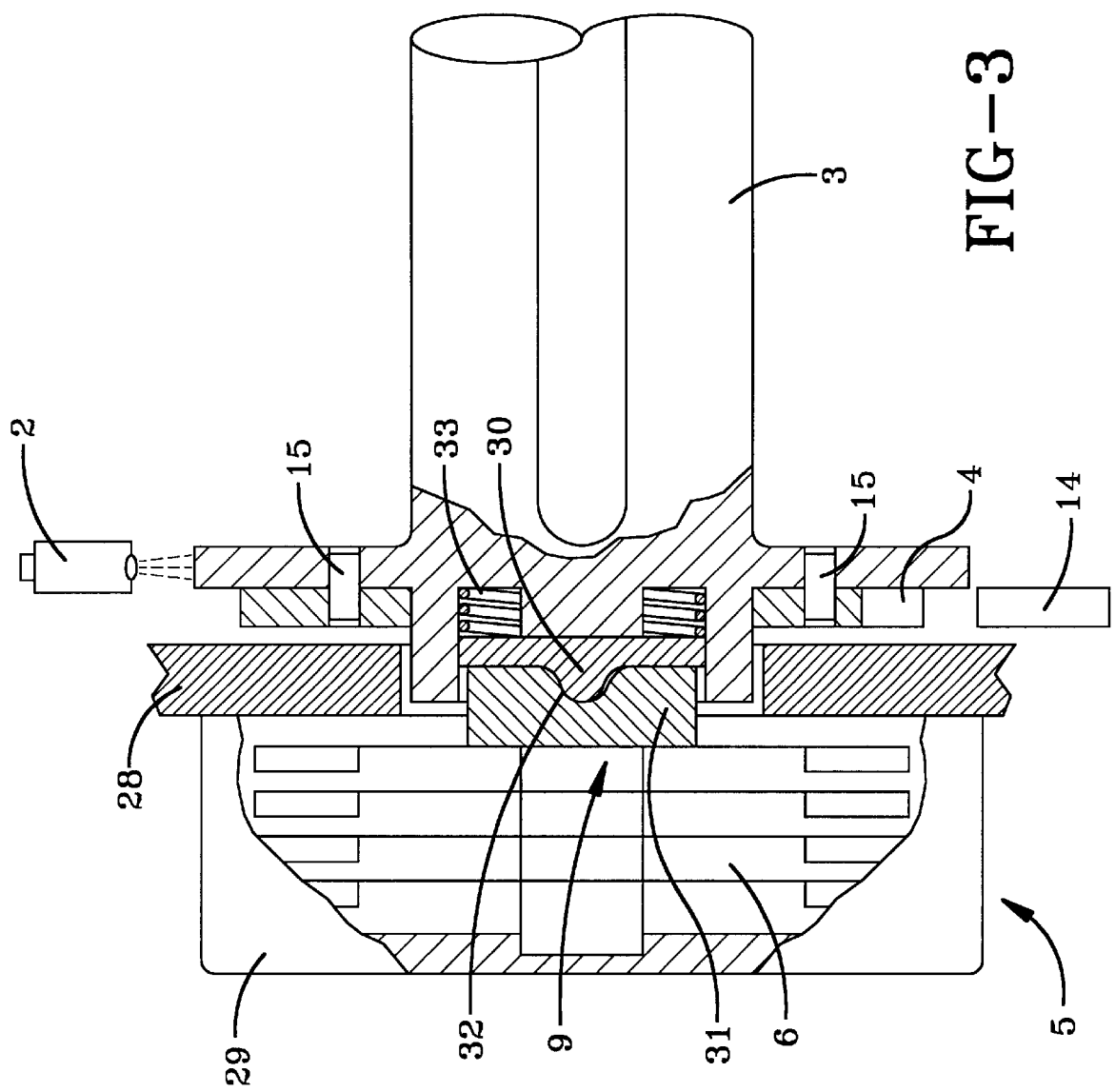
FIG. 3 shows a third embodiment of the invention with spherical rotary cam adjustment for adjusting the desired absorption of energy.

In the embodiment of FIG. 3, the load limiter 5 comprises a braking device 6 constructed in the manner of a multiple-disc clutch. Some of the multiple discs are mounted in a stationary manner on the frame 28 via a housing 29. Other discs are able to rotate with the belt shaft 3. During normal operation, the multiple discs are freely moveable relative to one another. During blocking engagement of the pawl 14 in the set of blocking teeth 4 and accelerated forward displacement of the vehicle occupant, the discs are pressed against one another with a variable contact pressure by a rotary cam adjuster 9 after shearing off of the shearing pins 15. The contact pressure with which the clutch discs rest against one another is changed by a spherical rotary cam 30 as a function of the acceleration of rotation of the belt reel 3 during the forward displacement of the vehicle occupant. For this purpose, the spherical rotary cam 30 that is mounted in a rotary cam socket 31 is displaced along a substantially conical cam mounting face 32 on the rotary cam socket. A spring 33 is compressed as a function of the velocity of rotation so that the pressure with which the clutch discs rest against one another is changed. In this embodiment, adjustment of the energy absorption of the load limiter as a function of the acceleration of rotation of the belt reel or of the velocity of belt extraction is achieved using purely mechanical means.

Figure 4:
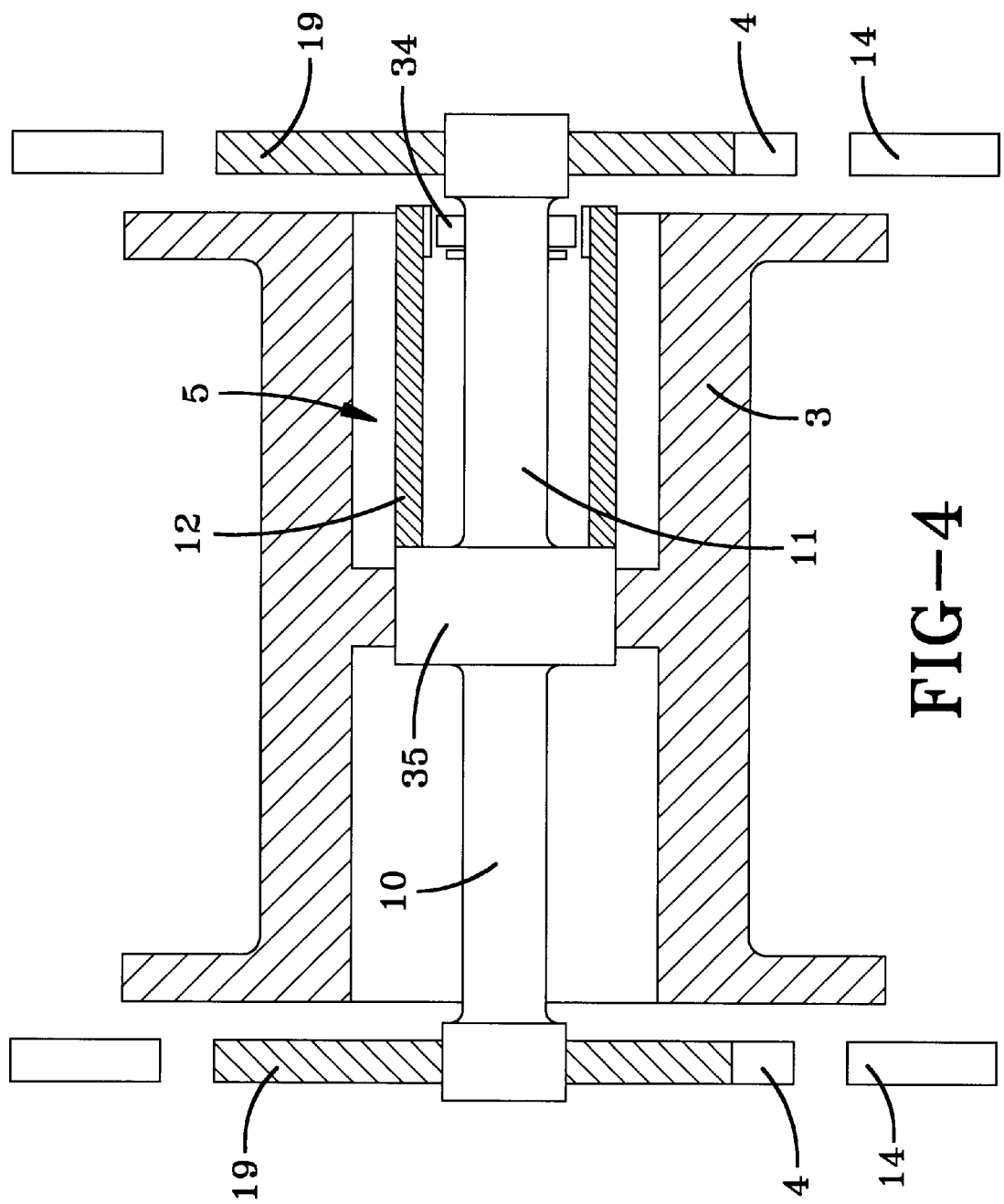
FIG. 4 shows a fourth embodiment of the invention with cumulatively switchable energy absorbers.

In the embodiment shown in FIG. 4, the load limiter 5 comprises energy absorbers 10, 11 and 12 that can be switched cumulatively. The two energy absorbers 10, 11 are designed as torsion bars. The energy absorber 12 is designed as a torsion sleeve that is arranged coaxially to the torsion bar 11. The three energy absorbers are located in a cavity in the belt reel 3. At their inner ends, the two torsion bars 10, 11 are connected non-rotatably to the belt reel 3 via a common interlocking part 35. The two outer ends of the torsion bars 10, 11 are connected non-rotatably to the terminal blocking discs 19. These blocking discs 19 can be blocked against rotation in the above-described manner by the associated blocking pawls 14.

The blocking pawls can also be brought selectively into engagement with one of the two sets of blocking teeth 4, as known, for example, from DE 196 50 494 A1. The belt reel 3 is rotated during forward displacement of the vehicle occupant; the energy consumed during rotation of the torsion bars 10, 11 or one of the two torsion bars having a load-limiting effect. If the rotational velocity exceeds a specific value, for example in the case of a 95th percentile man, a centrifugal clutch 34 reacts and connects the torsion sleeve 12 as an additional energy absorber. The centrifugal clutch 34 is located in the immediate vicinity of the end of the torsion bar 11 that is connected non-rotatably to the blocking disc 19. The clutch 34 can also be actuated by a speed sensor that scans the speed of rotation of the belt reel 3. A further torsion sleeve is connected in an intermediate stage of speed of rotation can also be provided on the side of the torsion bar 10.

Figure 5:
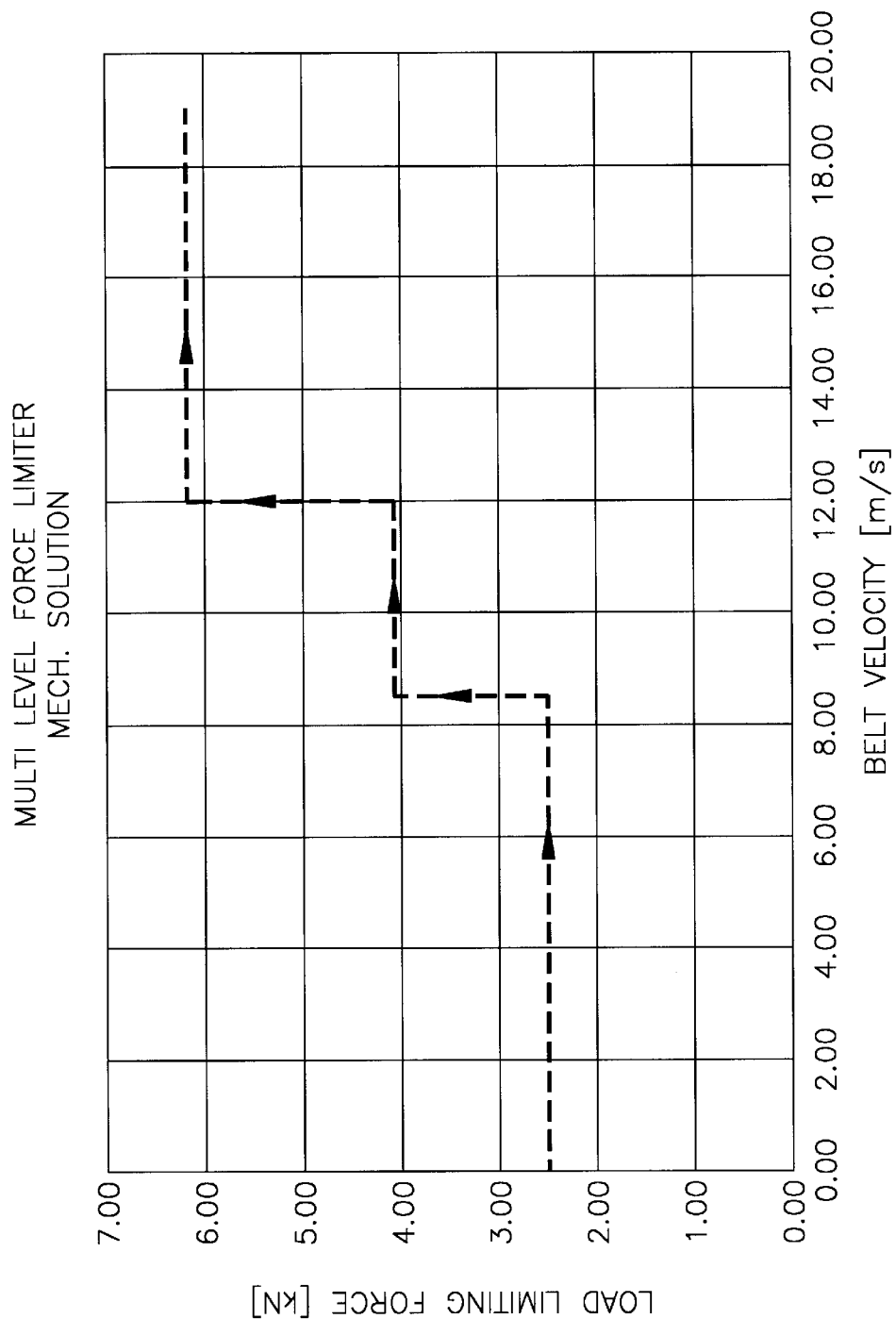
FIG. 5 is a force diagram showing various energy absorption steps as a function of the band extraction velocity.

FIG. 5 is a force diagram showing various energy absorption steps as a function of the belt extraction velocity (reel speed). Energy absorption steps of this type dependent on the belt extraction velocity determined by the scanning of the belt reel can be achieved in the embodiments illustrated. The dependency of the individual steps on the belt extraction velocity and the step height can obviously be modified.

With the embodiments illustrated, the necessary restraint characteristics can be produced by the load limiter, as a function of the crash event, in the range of a 5th percentile woman to a 95th percentile man.

Many changes and modifications in the above described embodiments of the invention can, of course, be carried out without departing from the scope thereof. Accordingly, that scope is intended to be limited only by the scope of the appended claims.

We claim:

1. A seat belt retractor comprising a belt reel for a seat belt webbing, a load limiter which allows limited extraction of the belt webbing with energy absorption when the belt reel is blocked, an adjusting device which adjusts the load limiter as a function of crash-related data, and a scanner for generating a measurement signal derived from a rotating movement of the belt reel, wherein said scanner measures an extracted length of belt webbing and/or a velocity of extraction of belt webbing and/or an acceleration of extraction of belt webbing; wherein the crash-related data is indirectly determined by the rotating movement of the belt reel, wherein the scanner scans co-rotating components of the belt reel, said co-rotating components are markings or teeth of a set of blocking teeth of the belt reel applied to the belt reel at equal angular intervals.

2. The seat belt retractor according to claim 1, wherein the co-rotating components are at identical rotational angle intervals from one another.

3. The seat belt retractor according to claim 1 wherein the measurement signal is compared with a belt force characteristic field and the load limiter is adjusted as a function of the comparison.

4. The seat belt retractor according to claim 1 wherein the load limiter comprises at least one energy absorber with variable energy absorption that is adjusted as a function of the measurement signal or of the measurement signals.

5. The seat belt retractor according to claim 4 wherein the variable energy absorber is a hydraulic pump, an electric motor or as a rotary cam adjuster.

6. The seat belt retractor according to claim 4 wherein the variable energy absorber is a hydraulic pump.

7. The seat belt retractor according to claim 4 wherein the variable energy absorber is an electric motor.

8. The seat belt retractor according to claim 4 wherein the variable energy absorber is a rotary cam adjuster.

9. The seat belt retractor according to claim 1 wherein the load limiter comprises at least one energy absorber with predetermined energy absorption.

10. The seat belt retractor according to claim 1 wherein the load limiter comprises a plurality of selectively cumulatively switchable energy absorbers.

11. The seat belt retractor according to claim 1 wherein the energy absorption of the load limiter can be adjusted stepwise as a function of the belt reel rotational speed.

12. The seat belt retractor according to claim 1 wherein the load limiter is a hydraulic pump.

13. The seat belt retractor according to claim 12 wherein a fluid is displaced by the hydraulic pump through a cross section of flow which can be adjusted by a controllable valve.

14. The Seat belt retractor according to claim 13 wherein the fluid displaced by the hydraulic pump is displaced in a closed circuit containing the valve.

15. The seat belt retractor according claim 13 wherein the valve is adjusted as a function of crash-related data.

16. The seat belt retractor according claim 14 wherein the valve is adjusted as a function of crash-related data.

* * * * *